(12) United States Patent
Venkitanarayanan et al.

(10) Patent No.: US 12,665,421 B2
(45) Date of Patent: Jun. 23, 2026

(54) SYSTEM AND METHOD FOR PROTECTING A PLURALITY OF DISTRIBUTED GENERATION RESOURCES

(71) Applicant: GE Infrastructure Technology LLC, Greenville, SC (US)

(72) Inventors: Vaidhya Nath Venkitanarayanan, Schenectady, NY (US); Timothy W. Jayko, Ballston Lake, NY (US); Charles Joseph Kosuth, Asheville, NC (US); Brian C. Reese, Inman, SC (US); Amy M. Ridenour, Salem, VA (US); Steven Wade Sutherland, Roanoke, VA (US); Logan Alphonse Toynbee, Palm Beach Gardens, FL (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 81 days.

(21) Appl. No.: 18/406,352

(22) Filed: Jan. 8, 2024

(65) Prior Publication Data

US 2025/0226656 A1 Jul. 10, 2025

(51) Int. Cl.
*H02H 3/00* (2006.01)
*H02H 1/00* (2006.01)
(Continued)

(52) U.S. Cl.
CPC ....... *H02J 3/00125* (2020.01); *H02H 1/0007* (2013.01); *H02H 3/021* (2013.01);
(Continued)

(58) Field of Classification Search
CPC .... H02J 3/00125; H02J 3/381; H02H 1/0007; H02H 3/021
(Continued)

(56) References Cited

U.S. PATENT DOCUMENTS 5,638,244 A * 6/1997 Mekanik ................. H02J 9/062
361/64
11,005,401 B1 * 5/2021 Howard ................ H02M 1/322
(Continued)

FOREIGN PATENT DOCUMENTS

CN      112 271 698 B      11/2022
EP        2282054 A2      2/2011

OTHER PUBLICATIONS

Kawady et al., Wind Farm Protection Systems: State of the Art and Challenges, Book: Distributed Generation, Feb. 2010, 25 Pages. Retrieved Oct. 10, 2023 from Weblink: https://www.researchgate.net/publication/221907529_Wind_Farm_Protection_Systems_State_of_the_Art_and_Challenges.

(Continued)

*Primary Examiner* — Crystal L Hammond
*Assistant Examiner* — Lucy M Thomas
(74) *Attorney, Agent, or Firm* — Dority & Manning, P.A.

(57) ABSTRACT

A method for providing multi-layer protection from faults for a power generation plant is provided. The method includes monitoring, via a system-level controller, one or more parameters at a first plurality of distributed generation resources. The method also includes implementing, via the system-level controller, a fault protection mode upon the one or more parameters of the first plurality of distributed generation resources exceeding a first threshold. Specifically, the fault protection mode includes implementing a time delay, and after the time delay, commanding, via the system-level controller, a trip of the first feeder breaker on a first feeder line. The method also includes exiting the fault protection mode when the one or more parameters of the first plurality of distributed generation resources are equal to or fall below the first threshold.

14 Claims, 7 Drawing Sheets

(51) Int. Cl.

| | |
|---|---|
| *H02H 3/02* | (2006.01) |
| *H02J 3/001* | (2026.01) |
| *H02J 3/38* | (2006.01) |
| *H02J 101/24* | (2026.01) |
| *H02J 101/28* | (2026.01) |

(52) U.S. Cl.
CPC ........... *H02J 3/381* (2013.01); *H02J 2101/24* (2026.01); *H02J 2101/28* (2026.01)

(58) Field of Classification Search
USPC .......................................................... 361/78
See application file for complete search history.

(56) References Cited

U.S. PATENT DOCUMENTS

| | | | | |
|---|---|---|---|---|
| 2008/0073912 A1* | 3/2008 | Fortmann | ............. | H02J 3/1885 |
| | | | | 290/55 |
| 2010/0327599 A1 | 12/2010 | Nielsen et al. | | |
| 2020/0041561 A1 | 2/2020 | Alibert et al. | | |
| 2020/0287387 A1* | 9/2020 | Schoebrechts | ............ | H02J 3/24 |
| 2021/0036507 A1 | 2/2021 | Du et al. | | |
| 2022/0137118 A1* | 5/2022 | Holliday, III | .......... | H02J 3/001 |
| | | | | 324/522 |

OTHER PUBLICATIONS

EPO Search Report, May 2, 2025.

Guoqi Chen et al: "The solution of the ground fault using GOOSE message in the wind farm system" Sustainable Power Generation and Supply, 2009. SUPERGEN '09. International Conference on, IEEE, Piscataway, NJ, USA, Apr. 6, 2009, pp. 1-5.

Mohamed Abdullah et al: "Protection algorithm of central relaying unit for wind farm based on directional algorithm", 2017 Nineteenth International Middle East Power Systems Conference (MEPCON), IEEE, Dec. 19, 2017, pp. 594-602.

Rahman Anisur et al: "Smart Substation Control and Protection Facilitating the Virtualization of Multiple Protection and Control", 2023 IEEE International Conference on Energy Technologies for Future Grids (ETFG), IEEE, Dec. 3, 2023, pp. 1-6.

EPO Office Action, Feb. 2, 2026.

Li Xu et al: "Accelerated Protection Scheme for Collector Power Line in DFIG-based Wind Farm", 2020 IEEE/Pes Transmission and Distribution Conference and Exposition (T&D), IEEE, Oct. 12, 2020 (Oct. 12, 2020), pp. 1-5.

* cited by examiner

700

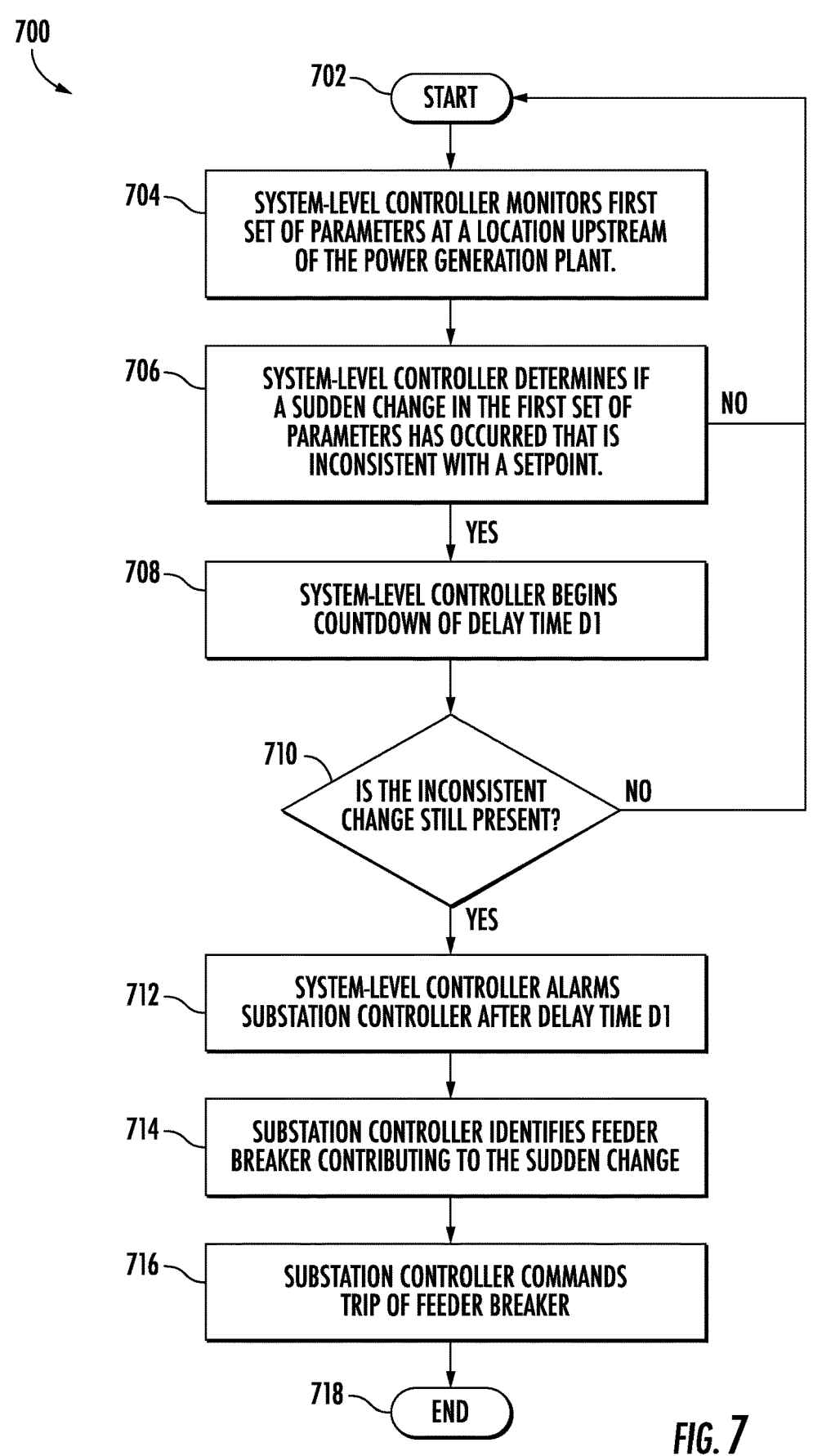

702 — START

704 — SYSTEM-LEVEL CONTROLLER MONITORS FIRST SET OF PARAMETERS AT A LOCATION UPSTREAM OF THE POWER GENERATION PLANT.

706 — SYSTEM-LEVEL CONTROLLER DETERMINES IF A SUDDEN CHANGE IN THE FIRST SET OF PARAMETERS HAS OCCURRED THAT IS INCONSISTENT WITH A SETPOINT.

NO

YES

708 — SYSTEM-LEVEL CONTROLLER BEGINS COUNTDOWN OF DELAY TIME D1

710 — IS THE INCONSISTENT CHANGE STILL PRESENT?

NO

YES

712 — SYSTEM-LEVEL CONTROLLER ALARMS SUBSTATION CONTROLLER AFTER DELAY TIME D1

714 — SUBSTATION CONTROLLER IDENTIFIES FEEDER BREAKER CONTRIBUTING TO THE SUDDEN CHANGE

716 — SUBSTATION CONTROLLER COMMANDS TRIP OF FEEDER BREAKER

718 — END

FIG. 7

SYSTEM AND METHOD FOR PROTECTING A PLURALITY OF DISTRIBUTED GENERATION RESOURCES

FIELD

The present disclosure relates generally to distributed generation resources, such as wind turbine power systems, solar inverters, or energy storage devices, and more particularly, to systems and methods for protecting a plurality of distributed generation resources, e.g., by tripping at least one feeder breaker.

BACKGROUND

Protection of distributed generation resources (DGRs) such as wind turbines, solar inverters, energy storage devices, and other DGRs is typically achieved solely by protective devices local to such generation. For example, a synchronizing contactor may be provided within the architecture of a DGR to match the frequency, phase, and voltage of the DGR with other DGRs located within an electrical grid. In addition, a circuit breaker may be provided with the DGR or upstream of the DGR along the power generation plant to provide protection of individual DGRs, series of DGRs, or the power generation plant from conditions such as an overload or a short circuit. For example, a feeder breaker may be provided as an upstream circuit breaker for a group of one or more of the DGRs.

However, the reach of feeder breakers and other upstream circuit breakers often does not extend past the low voltage (LV) side of the transformers of the DGRs due to the current being limited by its impedance. As an example, overload or short circuit protection of circuits in DGRs may be achieved by coordinating the tripping of the synchronizing contactor and the medium voltage (MV) switchgear local to an individual DGR. More specifically, overload protection that involves the DGR is typically realized by opening the synchronizing contactor, with the MV switchgear providing backup protection. In an example, in a wind turbine with a Doubly Fed Induction Generator (DFIG), for short circuit faults on the stator side of a wind turbine transformer, the MV switchgear is the sole means of protection, often with no autonomous backup.

As a consequence, there could exist power paths within individual DGR units that are solely dependent on one individual device (circuit breaker for example) for all its protection. If this device fails to operate the DGR unit is left with inadequate, or often non-existent, backup protection.

In view of the foregoing, the present disclosure is directed to a system and method that avoids undesirable short circuits and overloads through the use of a system-level controller. For example, the system-level controller may be configured to detect a fault inside the DGRs autonomously if required, or alternatively based on a directive from the faulted DGRs. Once a fault is detected, the system-level controller is configured to request or command a trip of a feeder breaker or another circuit breaker upstream the DGRs to clear the fault in an individual DGR, a series of DGRs, or the entire network of DGRs.

BRIEF DESCRIPTION

Aspects and advantages of the present disclosure will be set forth in part in the following description, or may be obvious from the description, or may be learned through practice of the present disclosure.

In one aspect, the present disclosure is directed to a method for providing multi-layer protection from faults for a power generation plant having a first plurality of distributed generation resources electrically connected to a first feeder line, the first feeder line being electrically connected to an electrical grid via a first feeder breaker. The method includes monitoring, via a system-level controller, one or more parameters at the first plurality of distributed generation resources. The method also includes implementing, via the system-level controller, a fault protection mode upon the one or more parameters of the first plurality of distributed generation resources exceeding a first threshold. Specifically, the fault protection mode includes implementing a time delay, and after the time delay, commanding, via the system-level controller, a trip of the first feeder breaker on the first feeder line. The method also includes exiting the fault protection mode when the one or more parameters of the first plurality of distributed generation resources are equal to or fall below the first threshold.

In an embodiment, the one or more parameters of the first plurality of distributed generation resources include at least one of voltage, current, active power, reactive power, rotor speed, electrical frequency, wind speed, light intensity, ultraviolet radiation intensity, or one or more fault codes of one or more of the first plurality of distributed generation resources.

In another embodiment the method further includes implementing, via the system-level controller, the fault protection mode upon the one or more parameters of the first plurality of distributed generation resources exceeding a second threshold, the second threshold being greater than the first threshold.

In still another embodiment, the first and second feeder lines are electrically connected to the electrical grid via at least one main breaker, the main breaker being upstream the first and second feeder breakers, the fault protection mode further including tripping the main breaker in addition to the first and second feeder breakers.

In yet another embodiment, the fault protection mode further includes allowing at least one fault clearing device within the first plurality of distributed generation resources to trip on its own within the time delay when the first threshold is exceeded, and determining, via the system-level controller, the time delay based on one or more predetermined settings when the second threshold is exceeded.

In a further embodiment, the fault protection mode further includes detecting that the first threshold or the second threshold is exceeded after the time delay, and implementing an additional time delay prior to commanding, via the system-level controller, the trip of the first feeder breaker on the first feeder line.

In still a further embodiment the method further includes monitoring the one or more parameters of the first plurality of distributed generation resources at an upstream location of the power generation plant in response to a communication failure between the system-level controller and the first plurality of distributed generation resources.

In another further embodiment the fault protection mode further includes allowing a local controller or relay in each of the first plurality of distributed generation resources, to command a first fault clearing device within each of the first plurality of distributed generation resources to trip prior to commanding the trip of the first feeder breaker.

In another embodiment fault protection mode further includes detecting that the first fault clearing device failed to trip, or that one or more parameters of the first plurality of distributed generation resources exceed the first threshold after commanding the first fault clearing device to trip, and allowing a local controller or relay in each of the first plurality of distributed generation resources, to command a second fault clearing device within each of the first plurality of distributed generation resources to trip.

In still another embodiment, the first plurality of distributed generation resources includes at least of one or more wind turbines, one or more solar inverters, one or more energy storage devices, or one or more hybrid inverter-based resources.

In another aspect, the present disclosure is directed to a system for providing multi-layer protection from faults for a power generation plant. The system includes a first plurality of distributed generation resources electrically connected to a first feeder line, the first feeder line being electrically connected to an electrical grid via a first feeder breaker, and a system-level controller. In particular, the system-level controller is configured to monitor one or more parameters at the first plurality of distributed generation resources. The system-level controller is also configured to implement a fault protection mode upon the one or more parameters of the first plurality of distributed generation resources exceeding a first threshold. Specifically, the fault protection mode includes implementing a time delay, commanding, via the system-level controller, a trip of the first feeder breaker on the first feeder line after the time delay, and exiting the fault protection mode when the one or more parameters of the first plurality of distributed generation resources are equal to or fall below the first threshold.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 7 illustrates a flow diagram of an embodiment of a fault protection mode, particularly illustrating a fault protection mode that utilizes parameters external to individual DGRs according to the present disclosure.

DETAILED DESCRIPTION

Figure 1:
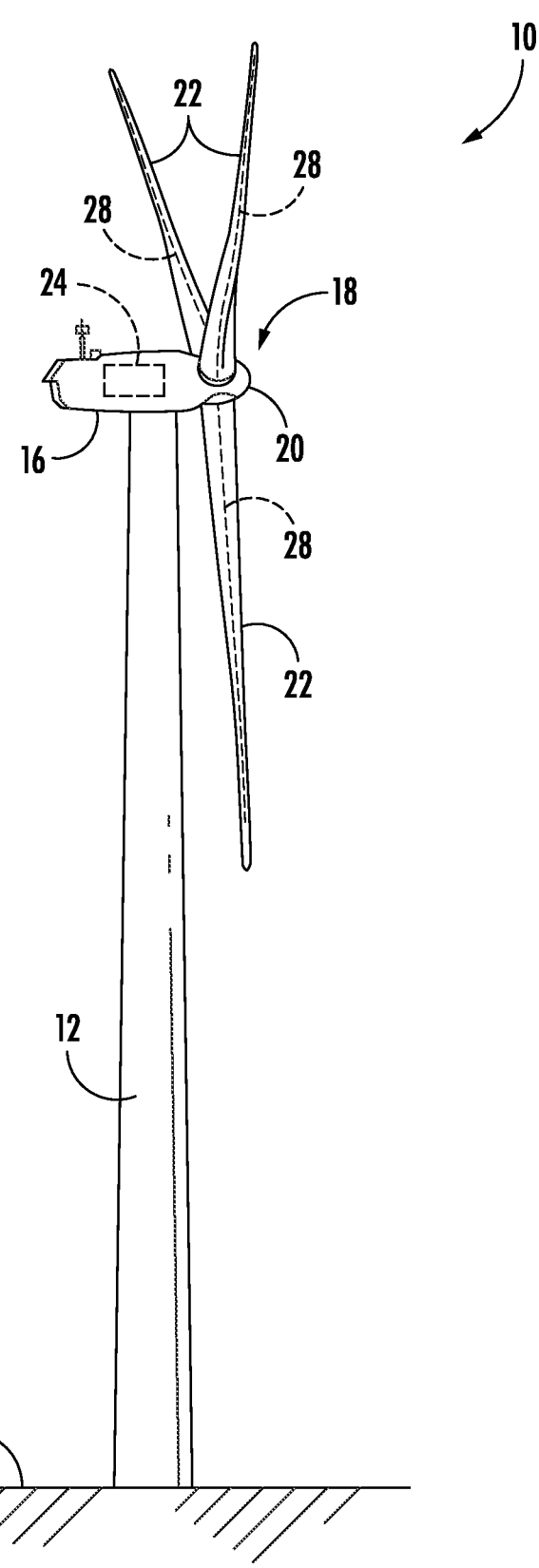
FIG. 1 illustrates a perspective view of one embodiment of a wind turbine according to the present disclosure.

Reference now will be made in detail to embodiments of the present disclosure, one or more examples of which are illustrated in the drawings. Each example is provided by way of an explanation of the present disclosure, not a limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

In general, the present disclosure is directed to systems and methods for providing multi-layer protection from faults for a power generation plant using a feeder breaker placed on a feeder line and a system-level controller. Specifically, in an embodiment, the system-level controller is configured to monitor one or more parameters at a distributed generation resource (DGR) within the power generation plant, such as a wind turbine, and implement a fault protection mode when the parameter(s) exceed a threshold so as to protect the power generation plant from faults. Thus, in certain embodiments, the systems and methods of the present disclosure are capable of providing improved protection of a power generation plant or individual DGRs within the power generation plant. For example, the systems and methods of the present disclosure are able to provide additional protection of DGRs in addition to existing protection within the DGRs. In addition, in certain embodiments, the systems and methods of the present disclosure are capable of providing this protection without significant cost or expense by building upon infrastructure that may already be provided with a typical power generation plant, such as a wind power generation plant.

Referring now to the drawings, FIG. 1 illustrates a perspective view of one embodiment of a wind turbine 10 that may implement the control technology according to the present disclosure. As described, the wind turbine 10 is one example of a DGR that can be protected using the systems and methods that will be described in greater detail hereinbelow. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various functions, such as receiving, transmitting, and/or executing wind turbine control signals. Accordingly, the controller 26 may generally be configured to control the various operating modes (e.g., start-up or shut-down sequences), de-rate the wind turbine, and/or control various components of the wind turbine 10 as will be discussed in more detail below.

Figure 2:
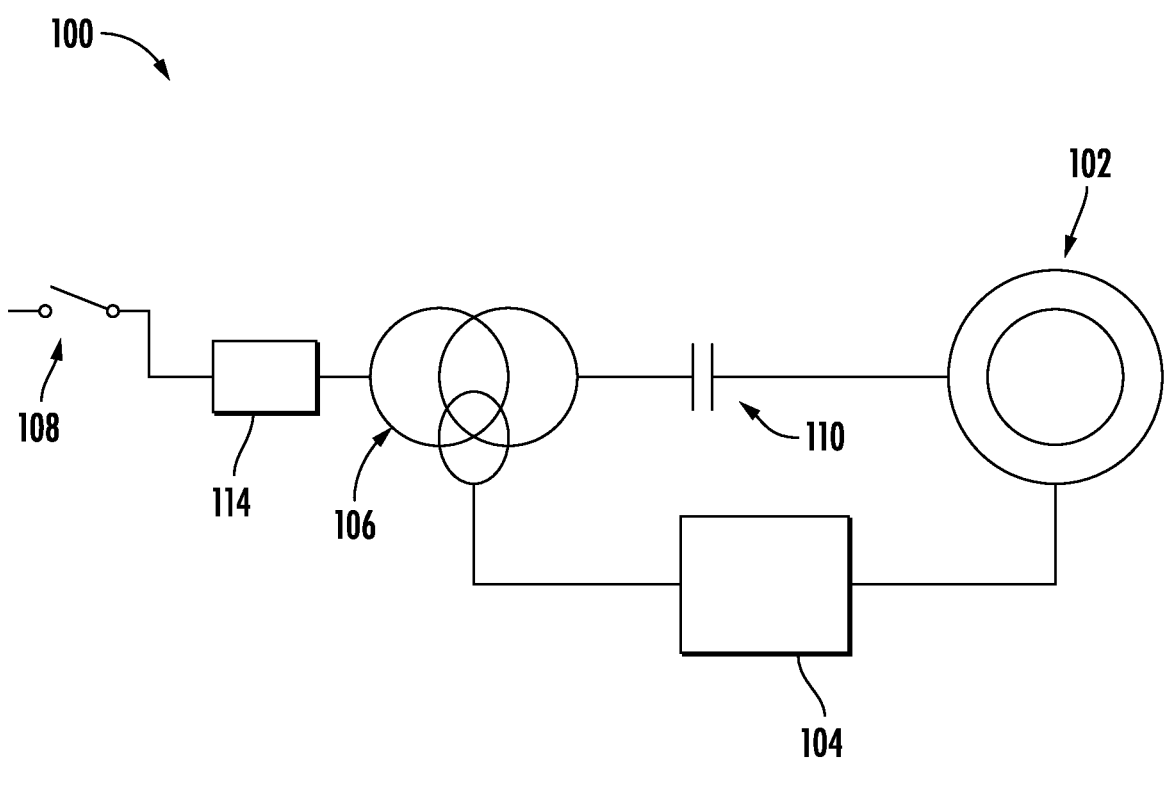
FIG. 2 illustrates a schematic diagram of an example embodiment of a distributed generation resource according to the present disclosure.

Referring now FIG. 2, a schematic diagram of an example embodiment of a DGR 100 is illustrated according to the present disclosure. As shown, the DGR 100 may be an inverter-based resource, such as a wind turbine power system, such as the wind turbine 10. In further embodiments, the DGR 100 may also be other types of DGRs such as solar inverters, energy storage devices, or hybrid inverter-based resources. Thus, it should be understood that although FIG. 2 may provide features specific to a particular type of DGR, the present disclosure should not be construed as being limited to a particular type of DGR. Turning now to the embodiment provided within FIG. 2, the DGR 100 may include a generator 102, a converter 104, a transformer 106, a feeder line switch 108, a first fault clearing device 110, and a second fault clearing device 114.

In an embodiment, the generator 102 may be a doubly-fed induction generator (DFIG). The generator 102 may also be any other type of power generation resource. Further, as shown, the generator 102 is connected with the converter 104 so as to change either the frequency or phase of an electrical output of the generator 102. Moreover, as shown, the generator 102 is also electrically connected with the transformer 106 such that the voltage of the electrical output of the generator 102 may be stepped up or stepped down. In addition, as shown, the transformer 106 is electrically connected to the electrical grid (not shown) via the feeder line switch 108 such that the electrical output of the generator 102 may be transmitted outside of the DGR 100.

Referring still to FIG. 2, the first fault clearing device 110 is provided between the generator 102 and the transformer 106. In an embodiment, the first fault clearing device 110 may be a synchronizing contactor or switch. Thus, in an embodiment, the first fault clearing device 110 is capable of providing fault protection within the DGR 100.

In addition, as shown, the second fault clearing device 114 is provided between the transformer 106 and the feeder line switch 108. In an embodiment, as shown, the second fault clearing device 114 may be a circuit breaker local to the DGR 100. As such, in an embodiment, the second fault clearing device 114 is capable of providing additional fault protection within the DGR 100. Thus, through the use of the first fault clearing device 110 and the second fault clearing device 114, greater protection local to the DGR 100 may be provided.

Figure 3:
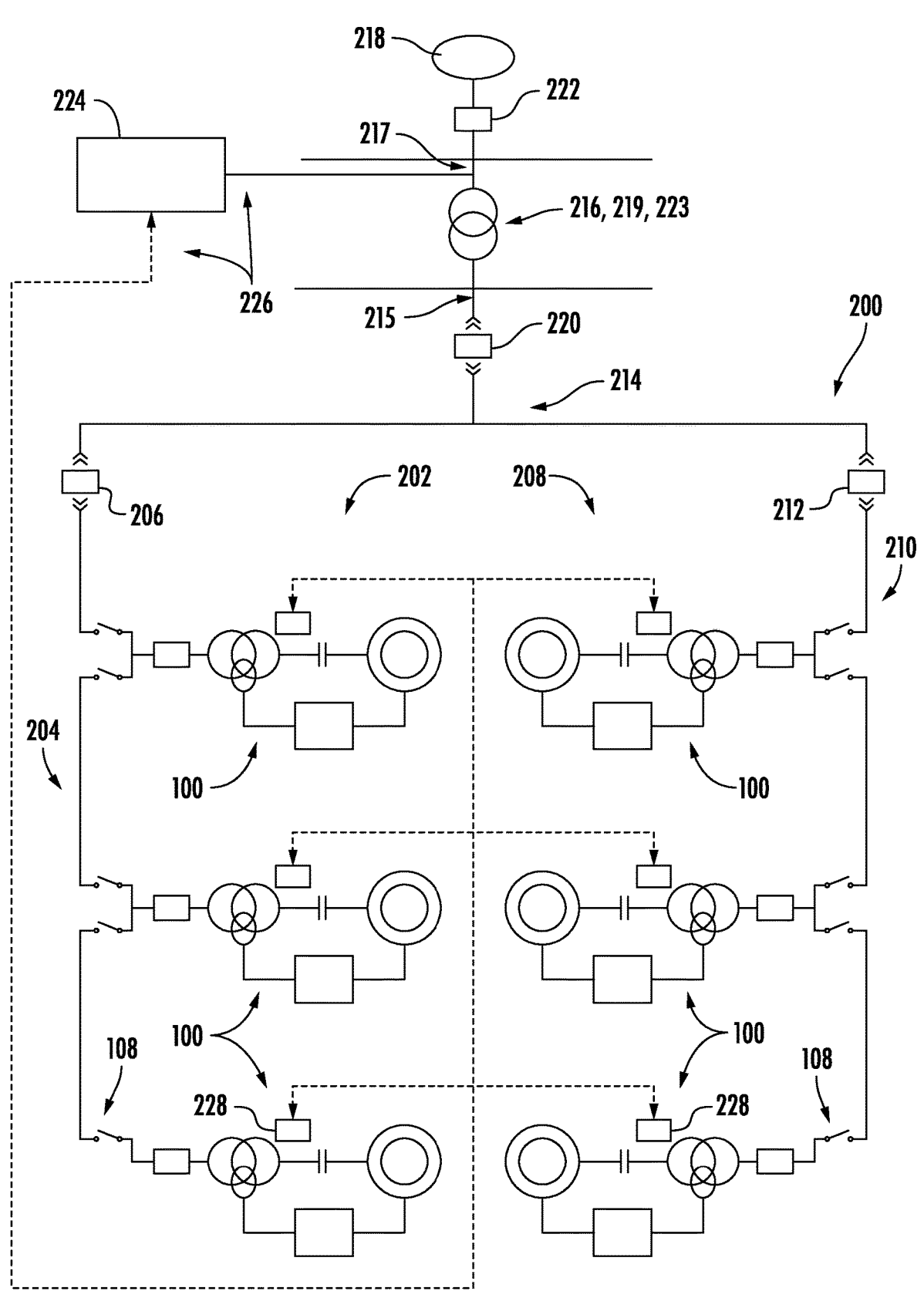
FIG. 3 illustrates a schematic diagram of an example embodiment of a power generation plant electrically connected to a grid according to the present disclosure.

Referring to FIG. 3, a schematic diagram of an example embodiment of a power generation plant 200 electrically connected to an electrical grid 218 according to the present disclosure is illustrated. As shown, the power generation plant 200 may include a first plurality of DGRs 202 connected to the electrical grid 218 via a first feeder line 204, and a first feeder breaker 206 on the first feeder line 204 for selectively electrically coupling the first feeder line 204 to the electrical grid 218. As detailed above, individual DGRs 100 may be a variety of apparatuses or devices, such as any of those described herein with respect to DGR 100 illustrated in FIG. 2. Thus, the individual DGRs 202 may be electrically connected to the first feeder line 204 via the feeder line switches 108 (FIG. 2).

The power generation plant 200 may also include additional feeder lines connecting additional DGRs to the electrical grid 218. For example, as shown, the power generation plan 200 includes a second plurality of DGRs 208, a second feeder line 210, and a second feeder breaker 212. It should be understood that the power generation plant 200 may include any suitable number of feeder lines having any suitable number of DGRs connected to the electrical grid. Moreover, it should be understood that, like the first plurality of DGRs 202, individual DGRs 100 within the second plurality of DGRs 208 may include various types of DGRs. Specifically, like the first plurality of DGRs 202, the individual DGRs 100 within the second plurality of DGRs 208 may include wind turbine power systems, solar inverters, energy storage devices, or hybrid inverter-based resources.

Like the first plurality of DGRs 202, the second plurality of DGRs 208 may be similarly electrically connected the electrical grid 218, e.g., via the second feeder line 210 and various feeder line switches. Also, like the first plurality of DGRs 202, the second feeder line 210 may be selectively electrically connected to the electrical grid 218 via the second feeder breaker 212 so as to provide protection to the power generation plant 200. In addition, it should be understood that the feeder breakers 206, 212, may be placed upstream of the feeder line switches 108 as shown in FIG. 3. The feeder breakers 206, 212, may also be placed in between the feeder line switches 108 if desired. To this end, any number of feeder breakers may be utilized according to the present disclosure.

Still referring to FIG. 3, the first feeder breaker 206 and the second feeder breaker 212 may be electrically connected to the electrical grid 218 via one or more electrical lines 214, upstream of the first and second feeder lines 204, 210. For example, as shown, the first and second feeder lines 204, 210 are electrically connected to a first electrical line 214. The first electrical line 214 is electrically connected to a second electrical line 215 via a first main breaker 220. The second electrical line 215 is connected to a third electrical line 217 via a transformer 216, which may be located at a substation 219 having a substation controller 225.

The third electrical line 217 is electrically connected to the electrical grid 218 via a second main breaker 222. Thus, like the first feeder breaker 206 and the second feeder breaker 212, the first main breaker 220 and the second main breaker 222 may provide protection to the power generation plant 200. It should be further understood that any number of electrical lines, such as more than three or less than three electrical lines, may also be included in the power generation plant 200.

In addition, in an embodiment, as shown, the power generation plant 200 may also include a system-level controller 224. More specifically, in an embodiment, the system-level controller 224 may be a Supervisory Control and Data Acquisition (SCADA) controller, Programmable Logic Controller (PLC), or other controller-based systems. Like the system-level controller 224, the substation controller 225 may also be a SCADA controller, a PLC, or other controller-based systems.

Accordingly, in an embodiment, the system-level controller 224 is capable of monitoring various parameters within individual DGRs 100 via a communication channel 226 between the system-level controller 224 and various local controllers 228 communicatively coupled with the individual DGRs 100. As described, it should be understood that local controllers 228 may also include local relays, or any other type of devices which provides commands or acts as a pass through for commands to the DGRs 100.

In an embodiment, the system-level controller 224 may monitor various parameters at the first plurality of DGRs 202, the second plurality of DGRs 208, and so on. The system-level controller 224 may also be capable of monitoring various parameters at an upstream location from the power generation plant 200 via hardwired and/or communication-based channel 226. This may be done continuously in addition to monitoring the individual DGRs 100 or in response to a communication failure between the system-level controller 224 and the first plurality of DGRs 202 or the second plurality of DGRs 208.

In an embodiment, the monitored parameter(s) may include various operating conditions or grid conditions, such as active power, reactive power, voltage, current, electrical frequency, generator rotor speed, as well as various fault codes generated by the DGRs 100. In addition, the system-level controller 224 may be capable of monitoring parameters specific to certain types of DGRs. For example, when the DGRs 100 are wind turbine power systems, the system-level controller 224 may monitor one or more wind parameters, such as wind speed, wind direction, etc. Alternatively, when the DGRs 100 are solar inverters, the system-level controller 224 may monitor light intensity, ultraviolet (UV) radiation intensity, etc.

Furthermore, in an embodiment, the system-level controller 224 may also be used to implement multiple forms of protection of the power generation plant 200. For example, the system-level controller 224 is capable of commanding a trip of the first feeder breaker 206, the second feeder breaker 212, the first main breaker 220, and/or the second main breaker 222. Moreover, the system-level controller 224 is capable of commanding the first and/or second fault clearing devices 110, 114 (FIG. 2) within the individual DGRs 100 to trip. The system-level controller 224 is also capable of identifying whether any of the electrical lines connected to any of the first fault clearing device 110, the second fault clearing device 114, the first feeder breaker 206, the second feeder breaker 212, the first main breaker 220, and/or the second main breaker 222 are contributing to a fault, and subsequently commanding a trip in response. To this end, the system-level controller 224 may be provided with various fault protection modes and other methods of operation as will be discussed in greater detail below.

Figure 4:
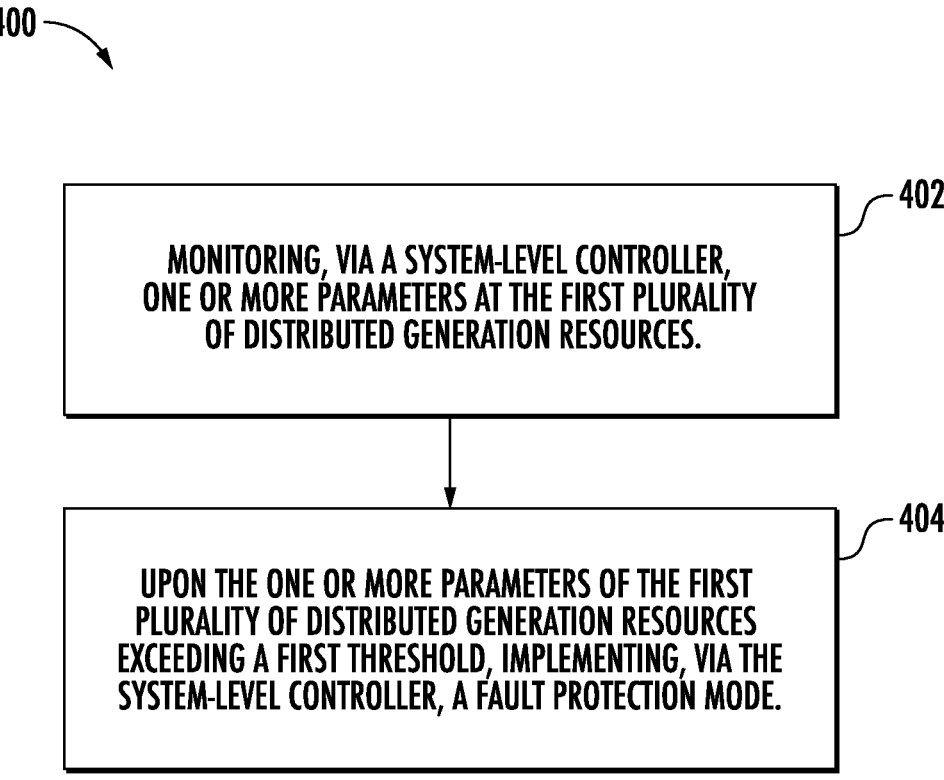
FIG. 4 illustrates a flow chart of an embodiment of a method for providing multi-layer protection from faults for a power generation plant using a system-level controller having a fault protection mode according to the present disclosure.

Each of the embodiments discussed in reference to FIG. 2 and FIG. 3 may benefit from improved multi-layer protection from faults. For example, the DGR 100 of FIG. 2 or the power generation plant 200 of FIG. 3 may be better protected through utilization of a system-level controller, such as the system-level controller 224 described herein. For example, FIG. 4 illustrates a flow diagram of a method 400 for providing multi-layer protection from faults for a power generation plant using a system-level controller having a fault protection mode according to the present disclosure. FIG. 4 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 includes monitoring, via a system-level controller, one or more parameters at the first plurality of DGRs, such as the first plurality of DGRs 202. A second plurality of DGRs may also be monitored, such as the second plurality of DGRs 208. For example, in an embodiment, as mentioned, the system-level controller 224 may monitor various operating, grid, or wind conditions, such as active power, reactive power, voltage, current, electrical frequency, generator rotor speed, fault codes, wind parameters, environmental conditions, etc.

As shown at (404), the method 400 includes implementing, via the system-level controller, a fault protection mode upon the parameter(s) of the first plurality of DGRs exceeding a first threshold. The fault protection mode will be described using the DGR 100 and the power generation plant 200 described above. However, one of ordinary skill in the art will understand that the fault protection mode may be implemented with other types of power generation plants and DGRs.

Generally, the fault protection mode may include implementing a time delay based upon the type of conditions of the parameters. After the time delay, the fault protection mode may include commanding a feeder breaker to trip, such as the first feeder breaker 206 or the second feeder breaker 212. The fault protection mode may also include exiting the fault protection mode when parameters are at an acceptable level. Additional implementations of the fault protection mode are further described herein with reference to FIGS. 5-7.

Figure 5:
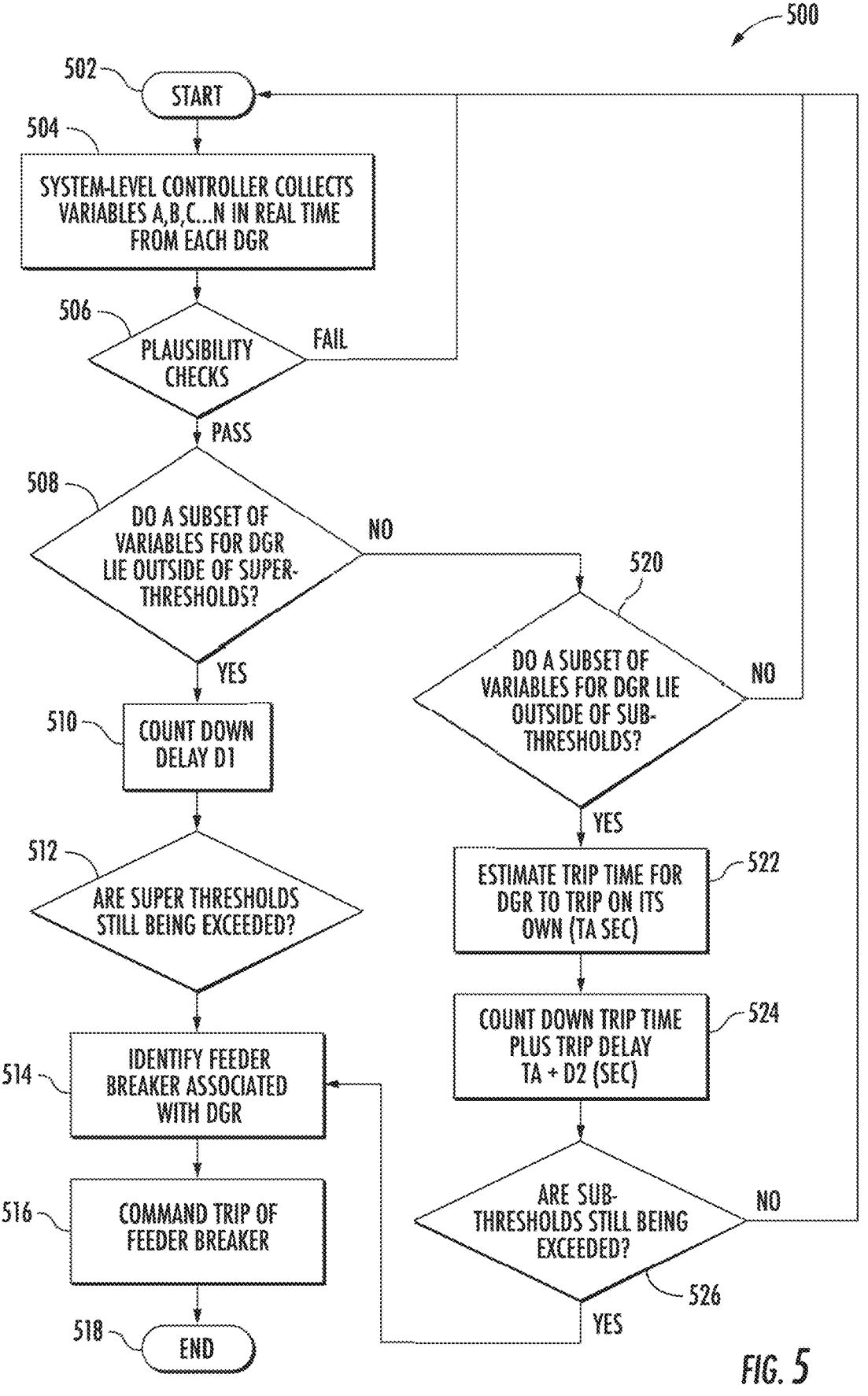
FIG. 5 illustrates a flow diagram of an embodiment of a fault protection mode, particularly illustrating a fault protection mode that provides multiple threshold conditions according to the present disclosure.
Figure 6:
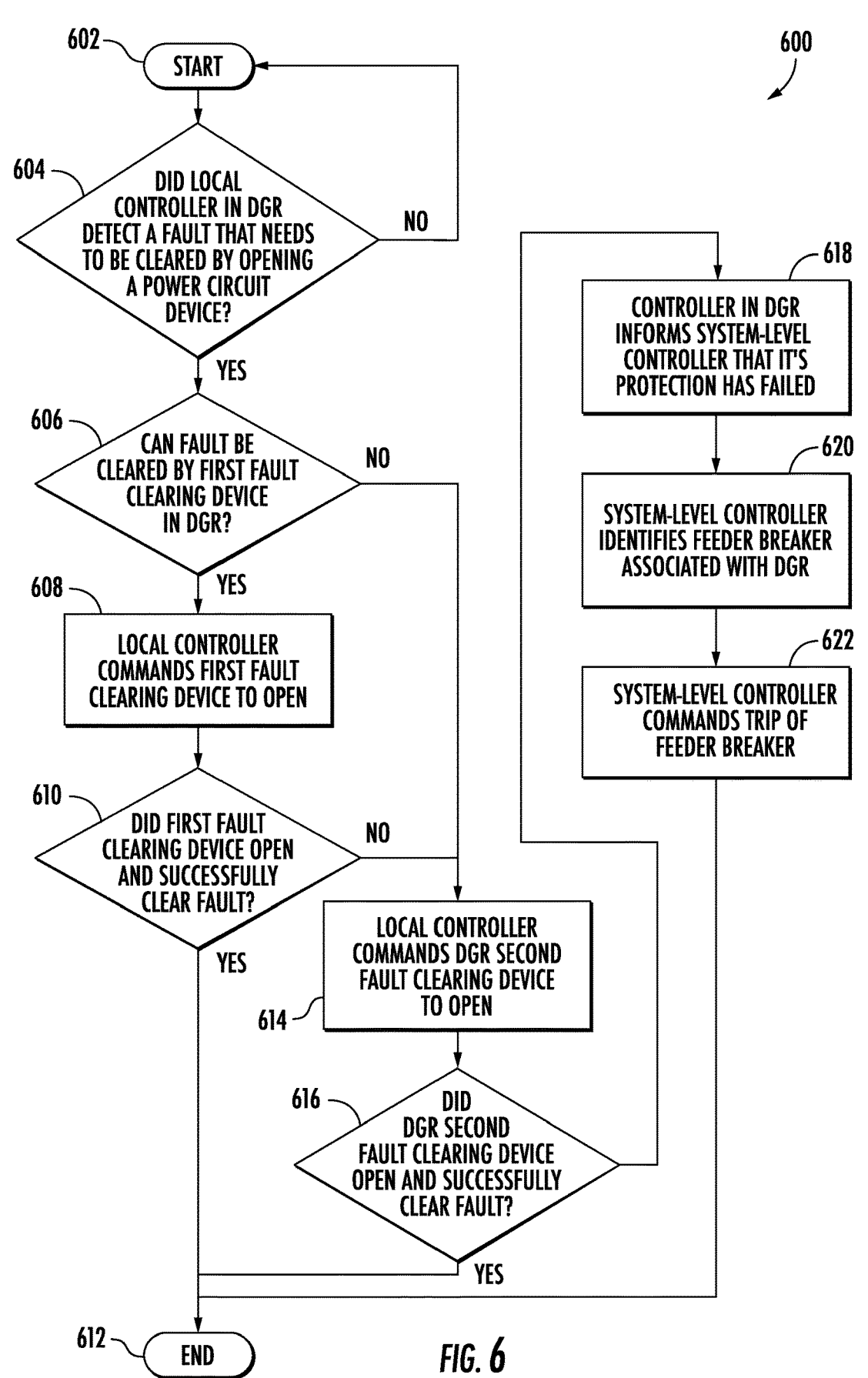
FIG. 6 illustrates a flow diagram of an embodiment of a fault protection mode, particularly illustrating a fault protection mode that utilizes both a system-level controller and a local DGR controller according to the present disclosure.

For example, referring particularly to FIG. 5, a flow diagram of an embodiment of a fault protection mode 500 that provides multiple threshold conditions is provided. As shown at (502), the fault protection mode 500 starts. As shown at (504), the system-level controller 224 collects one or more parameters from individual DGRs 100, such as the DGRs within the first plurality of DGRs 202 or the second plurality of DGRs 208. As shown at (506), the system-level controller 224 is configured to implement a plausibility check. If the plausibility check fails, the fault protection mode 500 returns to (502). If the plausibility check passes, as shown at (506), the system-level controller 224 is configured to determine whether a subset of the parameters (i.e., one or more parameters or any one of the parameters) for a DGR 100 exceeds or outside a threshold such as a super-threshold as shown at (508). If a subset of parameters lies outside the super-threshold, then as shown at (510), the system-level controller 224 may implement a time delay that is determined based on one or more predetermined settings set by the system-level controller 224.

For example, these settings for the super-threshold may forgo the step of allowing the fault clearing devices 110, 114 within the DGRs 100 of the first or second plurality of DGRs 202, 208 to trip within the time delay. This may be done to avoid any damage to the components within the DGRs 100 of the first or second plurality of DGRs 202, 208 as a result of failing to trip in time when the parameters are at a higher level as indicated by the super-threshold, especially when compared with a sub-threshold which will be discussed in greater detail hereinbelow.

As shown at (512), the super-threshold response may also include a check of the DGRs 100 to determine if the super-threshold is still being exceeded after the time delay. This check may not necessarily consider the fault clearing devices 110, 114 and instead only determine whether the parameters associated with the super-threshold are still exceeded.

If the subset of parameters still exceeds the super-threshold, then, as shown at (514), the fault protection mode 500 will first identify the feeder breaker 206, 212, associated with the DGR 100 that is expressing a subset of parameters larger than the super-threshold. Once identified, the system-level controller 224 will command a trip of the feeder breaker 206, 212 associated with the DGR 100 expressing the elevated parameters as shown at (516). Once the fault is cleared, the fault protection mode 500 will end as shown at (518) and normal operation of the power generation plant 200 will resume. It should be understood that the end of the fault protection mode 500 may also mean that the fault protection mode returns to (502).

Returning to the scenario indicated by (508), if super-thresholds are not exceeded, then, as shown at (520), the system-level controller 224 will implement a check to determine whether the subset of parameters exceeds a sub-threshold where the sub-threshold lies within the super-threshold. Specifically, the sub-threshold may be a first threshold and the super-threshold may be a second threshold where the first threshold lies inside of the second threshold.

If the subset of parameters does not exceed the sub-threshold, then the fault protection mode 500 returns to (502). On the other hand, if the subset of parameters does exceed the sub-threshold, then, as shown at (522), the system-level controller 224 will estimate the time for the DGR 100 associated with the exceeded sub-threshold to trip on its own by, for example, using the fault clearing devices 110, 114. Once the time has been estimated, then, as shown at (524), the system-level controller 224 will implement a countdown for the time for the DGR 100 associated with the exceeded sub-threshold to trip on its own. The countdown shown by (524) may also include an additional time delay to prevent nuisance tripping of the feeder breakers 206, 212 so that energy transmission by the power generation plant 200 may be maintained without interruption.

After the countdown, the fault protection mode 500 may include a check by the system-level controller 224 to determine if the sub-threshold is still being exceeded as shown by (526). If the sub-threshold is no longer exceeded, then the fault protection mode 500 returns to (502). However, if the sub-threshold is exceeded, then, the system-level controller may begin the series of commands (514), (516), and (518) described above to command a trip of the feeder breakers 206, 212 to clear the fault and return the power generation plant 200 to normal operation.

Generally, the fault protection mode primarily utilizes the system-level controller, but may also operate in concert with local DGR-level controllers, such as local controller 228. For example, referring now to FIG. 6, a flow diagram of an embodiment of a fault protection mode is provided. As shown at (602), the fault protection mode 600 starts. As shown at (604), the local controller 228 for each DGR 100 determines whether a fault exists within the DGR 100. For example, the local controller 228 or the system-level controller 224 may determine that parameters from the DGR 100 exceed a threshold to determine a fault exists. The local controller 228 may also receive one or more fault codes from any of the components within the DGR 100 which would indicate a fault exists to the local controller 228. If no fault is detected by the local controller 228, then the fault protection mode 600 returns to (602).

However, if a fault does exist, then, as shown by (606), the local level controller 228 will determine if it can clear the fault in the DGR 100. If the local level controller 228 determines it can clear the fault, then, as shown at (608), the local level controller 228 will command a first fault clearing device 110, such as a synchronizing contactor, to open and clear the fault. After the command, the local level controller 228 will determine whether the first fault clearing device 110 opened and successfully cleared the fault as shown by (610). If desired, either the system-level controller 224 or the local controller 228 may check whether the first fault clearing device 110 was successful in clearing the fault. If the fault was successfully cleared, then the fault protection mode 600 will end and the power generation plant 200 will return to normal operation as shown by (612). The end, as indicated by (612), may also mean returning to the start as shown by (602).

If, however, either the first fault clearing device 110 determines it is incapable of clearing the fault or the first fault clearing device 110 determines it is capable of clearing the fault, but fails to clear the fault, the local level controller 228 may command a second fault clearing device 114, such as an MV switchgear, to open as shown at (614). After the command, the local level controller 228 may determine whether the second fault clearing device 114 was successful in clearing the fault as shown by (616). Like the first fault clearing device 110, either the system-level controller 224 or the local controller 228 may check whether the second fault clearing device 114 was successful in clearing the fault. If the second fault clearing device 114 was successful, then the fault protection mode will end as shown by (612). However, if the second fault clearing device 114 was unsuccessful, then, as shown by (618), the local level controller may inform the system-level controller 224 that the local level controller's 228 protection of the DGR 100 has failed.

Once informed, the system-level controller may identify the feeder breaker 206, 210 associated with the reported fault as shown by (620). Once identified, the system-level controller 224 may then command a trip of the feeder breaker 206, 212 to clear the fault in the DGR 100. After the fault is cleared, the fault protection mode ends as shown by (612). Thus, through the use of the fault protection mode 600, prioritization of local level resources, such as the fault clearing device 110 and the second fault clearing device 114, may be prioritized such that overutilization of the feeder breakers 206, 210 may be avoided and power generation from either the first plurality or second plurality of DGRs 202, 208 may be maintained.

The fault protection mode may also monitor parameters that are external to individual DGRs or pluralities of DGRs. For example, referring now to FIG. 7, a flow diagram of an embodiment of a fault protection mode that utilizes parameters external to individual DGRs is provided.

As shown at (702), the fault protection mode 700 starts. As shown at (704), the system-level controller 224 may monitor a first set of parameters at a location upstream of the power generation plant 200. For example, the upstream location may be at the transformer 216, the first main breaker 220, or the second main breaker 222. In addition, the first set of parameters may be any parameters previously described. However, in an exemplary embodiment, the first set of parameters may include either the voltage or the current at the upstream location. The monitored voltage or current may then be converted to actual power or reactive power for use by the system-level controller 224 in the fault protection mode 700. Monitoring at the upstream location may be especially advantageous in the event of a communication failure between the system-level controller 224 and the first or second plurality of distributed generation resources 202, 208. In such a scenario, the system-level controller 224 may utilize the first or second main breakers 220, 222 to clear a fault or lower parameters that exceed a threshold within the first or second plurality of DGRs 202, 208. Additionally, the system-level controller may utilize a substation controller 225 to trip the first or second feeder breakers 206, 212 as will be discussed in greater detail below.

As shown at (704), the system-level controller 224 may determine if a sudden change (i.e., an exceeded threshold) in the first set of parameters has occurred that is inconsistent with a setpoint or understood level for which the subset of parameters should be at. For example, in an exemplary embodiment, if the first set of parameters monitored at the upstream location includes voltage or current (which is converted to active or reactive power), the system-level controller may compare the active or reactive power at the upstream location with a setpoint for which the active or reactive power should be at.

This setpoint may be based upon other factors acquired at other locations of the power generation plant 200. For example, the setpoint may be a second set of parameters monitored at other locations in the power generation plant 200. For example, if the first set of parameters at the upstream location being monitored are current or voltage (which is converted to active or reactive power), the second set of parameters used to provide the setpoint may be voltage, current, active power, reactive power, rotor speed, electrical frequency, wind speed, light intensity, ultraviolet radiation intensity at the first or second plurality of DGRs 202, 208.

If a sudden change has not occurred, then the fault protection mode 700 returns to (702). However, if a sudden change has occurred, then, as shown at (706), the fault protection mode 700 may include providing a time delay, similar to the time delays discussed with reference to either fault protection mode 500 or fault protection mode 600. After the time delay, the system-level controller 224 may determine if the discrepancy between the first set of parameters and the set point or second set of parameters still is present as shown at (708). If the inconsistency between the first set of parameters and the set point is no longer present, then the fault protection mode 700 returns to (702).

However, if the inconsistency still exists between the first set of parameters and the set point, then, as shown at (710), the system-level controller 224 sends an alarm to the substation controller 225 at the substation 219 after the time delay. After the alarm is received by the substation controller 224, the substation controller identifies which of the feeder breakers 206, 212 is associated with the sudden change in the first set of parameters as shown at (712). Once the feeder breakers 206, 212 is associated with the sudden change in the first set of parameters is identified, then, as shown at (714), the substation controller 224 commands a trip of the feeder breaker 206, 212 is associated with the sudden change in the first set of parameters. After the first set of parameters return to values consistent with the setpoint or a fault has otherwise been cleared from the power generation plant 200, the fault protection mode 700 ends and the power generation plant 200 returns to normal operation as shown at (716). It should be understood that the end, indicated by (716), may also be a return to (702).

Thus, each of the fault protection modes 500, 600, 700 may provide a unique means of protection for the DGRs, the plurality of DGRs, and the power generation plant using the resources, i.e., the feeder breakers, provided within the power generation plant.

In addition to the first feeder breaker 206 and the second feeder breaker 212, the fault protection modes 500, 600, and 700 may also utilize the first main breaker 220 and the second main breaker 222. For example, the fault protection modes 500, 600, and 700 may implement a trip of the first feeder breaker 206 and the second feeder breaker 212, and if a trip of the first feeder breaker 206 and the second feeder breaker 212 is unsuccessful or fails to provide a desired outcome, the fault protection modes 500, 600, and 700 may implement a trip of either the first main breaker 220 or the second main breaker 222. Thus, further protection of the power generation plant 200 may be provided using the fault protection modes 500, 600, and 700.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing multi-layer protection from faults for a power generation plant having a first plurality of distributed generation resources electrically connected to a first feeder line, the first feeder line being electrically connected to an electrical grid via a first feeder breaker, the method comprising:

monitoring, via a system-level controller, one or more parameters at the first plurality of distributed generation resources;

upon the one or more parameters of the first plurality of distributed generation resources exceeding a first threshold or a second threshold that is greater than the first threshold, implementing, via the system-level controller, a fault protection mode, the fault protection mode comprising:

implementing a time delay, wherein the time delay is determined, via the system-level controller, based on one or more predetermined settings when the second threshold is exceeded, and wherein the time delay is determined, via the system-level controller, based on an estimated trip time within which at least one fault clearing device within the first plurality of distributed generation resources will trip on its own and an additional time delay when the first threshold is exceeded;

after the time delay, commanding, via the system-level controller, a trip of the first feeder breaker on the first feeder line when the one or more parameters of the first plurality of distributed generation resources exceeds the first threshold or the second threshold; and exiting the fault protection mode when the one or more parameters of the first plurality of distributed generation resources are equal to or fall below the first threshold.

2. The method of claim 1, wherein the one or more parameters of the first plurality of distributed generation resources comprise at least one of voltage, current, active power, reactive power, rotor speed, electrical frequency, wind speed, light intensity, ultraviolet radiation intensity, or one or more fault codes of one or more of the first plurality of distributed generation resources.

3. The method of claim 1, wherein the first feeder line is electrically connected to the electrical grid via at least one main breaker, the main breaker being upstream the first feeder breaker, the fault protection mode further comprising tripping the main breaker in addition to the first feeder breaker.

4. The method of claim 1, further comprising monitoring the one or more parameters of the first plurality of distributed generation resources at an upstream location of the power generation plant in response to a communication failure between the system-level controller and the first plurality of distributed generation resources.

5. The method of claim 1, wherein the fault protection mode further comprises:

allowing a local controller or relay in each of the first plurality of distributed generation resources, to command a first fault clearing device within each of the first plurality of distributed generation resources to trip prior to commanding the trip of the first feeder breaker.

6. The method of claim 5, wherein the fault protection mode further comprises:

detecting that the first fault clearing device failed to trip, or that one or more parameters of the first plurality of distributed generation resources exceed the first threshold after commanding the first fault clearing device to trip; and allowing the local controller or relay in each of the first plurality of distributed generation resources, to command a second fault clearing device within each of the first plurality of distributed generation resources to trip.

7. The method of claim 1, wherein the first plurality of distributed generation resources comprises at least of one or more wind turbines, one or more solar inverters, one or more energy storage devices, or one or more hybrid inverter-based resources.

8. A system for providing multi-layer protection from faults for a power generation plant, the system comprising:

a first plurality of distributed generation resources electrically connected to a first feeder line, the first feeder line being electrically connected to an electrical grid via a first feeder breaker; and a system-level controller configured to:

monitor one or more parameters at the first plurality of distributed generation resources, upon the one or more parameters of the first plurality of distributed generation resources exceeding a first threshold or a second threshold that is greater than the first threshold, implement, via the system level controller, a fault protection mode, the fault protection mode comprising:

implementing a time delay, wherein the time delay is determined, via the system-level controller, based on one or more predetermined settings when the second threshold is exceeded, and wherein the time delay is determined, via the system-level controller, based on an estimated trip time within which at least one fault clearing device within the first plurality of distributed generation resources will trip on its own and an additional time delay when the first threshold is exceeded;

after the time delay, commanding, via the system-level controller, a trip of the first feeder breaker on the first feeder line when the one or more parameters of the first plurality of distributed generation resources exceeds the first threshold or the second threshold; and exiting the fault protection mode when the one or more parameters of the first plurality of distributed generation resources are equal to or fall below the first threshold.

9. The system of claim 8, wherein the one or more parameters of the first plurality of distributed generation resources comprise at least one of voltage, current, active power, reactive power, rotor speed, electrical frequency, wind speed, light intensity, ultraviolet radiation intensity, or one or more fault codes of one or more of the first plurality of distributed generation resources.

10. The system of claim 8, wherein the first feeder line is electrically connected to the electrical grid via at least one main breaker, the main breaker being upstream the first feeder breaker, the fault protection mode further comprising tripping the main breaker in addition to the first feeder breaker.

11. The system of claim 8, wherein the system-level controller is further configured to monitor the one or more parameters at an upstream location of the power generation plant in response to a communication failure between the system-level controller and the first plurality of distributed generation resources.

12. The system of claim 8, wherein the fault protection mode further comprises:

allowing a local controller or relay in each of the first plurality of distributed generation resources, to command a first fault clearing device within each of the first plurality of distributed generation resources to trip prior to commanding the trip of the first feeder breaker.

13. The system of claim 12, wherein the fault protection mode further comprises:

detecting that the first fault clearing device failed to trip, or that one or more parameters of the first plurality of distributed generation resources exceed the first threshold after commanding the first fault clearing device to trip; and allowing the local controller or relay in each of the first plurality of distributed generation resources, to command a second fault clearing device within each of the first plurality of distributed generation resources to trip.

14. The system of claim 8, wherein the first plurality of distributed generation resources comprises at least of one or more wind turbines, one or more solar inverters, one or more energy storage devices, or one or more hybrid inverter-based resources.

\* \* \* \* \*